United States Patent [19]

Rumble

[11] Patent Number: 4,524,935
[45] Date of Patent: * Jun. 25, 1985

[54] PIPE HANGER

[75] Inventor: Ray M. Rumble, Canfield, Ohio

[73] Assignee: Michigan Hanger Company, Inc., Hubbard, Ohio

[ * ] Notice: The portion of the term of this patent subsequent to Dec. 18, 2001 has been disclaimed.

[21] Appl. No.: 556,778

[22] Filed: Dec. 1, 1983

Related U.S. Application Data

[63] Continuation of Ser. No. 381,077, May 24, 1982, which is a continuation-in-part of Ser. No. 257,599, Apr. 27, 1981, abandoned.

[51] Int. Cl.$^3$ .............................................. F16L 3/00
[52] U.S. Cl. ............................................ 248/62; 248/59
[58] Field of Search .................. 248/59, 58, 62, 63, 248/316 A, 297.5; 403/326, 329

[56] References Cited

U.S. PATENT DOCUMENTS

| | | | |
|---|---|---|---|
| 1,898,898 | 2/1933 | Rowley | 248/62 |
| 2,158,802 | 5/1939 | Redlon | 248/62 |
| 2,621,906 | 12/1952 | Guilder | 403/326 |
| 2,893,670 | 7/1959 | Adams | 248/59 |
| 4,166,600 | 9/1979 | Perjes | 248/59 |
| 4,247,147 | 1/1981 | Rettkowski | 403/326 |
| 4,305,557 | 12/1981 | Kowalski | 248/59 |
| 4,306,696 | 12/1981 | Pondman | 248/59 |

FOREIGN PATENT DOCUMENTS 0592837  11/1977  Switzerland ......................... 248/62

*Primary Examiner*—William H. Schultz
*Assistant Examiner*—Ramon O. Ramirez
*Attorney, Agent, or Firm*—Harpman & Harpman

[57] ABSTRACT

A pipe hanger arranged to be positioned about a pipe to be suspended, moved to closed position and engaged upon a threaded support rod so as to carry the pipe is disclosed. The hanger takes the form of an elongated band preferably metal, the ends of which are brought into proximity to one another by bending the band into a general oval shape, the ends of the band are formed in configurations registering with the thread pattern of the support rod when engaged thereagainst and a ferrule is moved downwardly over the ends of the band so as to move the same into forceful engagement with the threaded supporting rod. Locking devices on the ferrule engage at least one of the ends of the band and/or support rod so as to hold the ferrule in a position in which the ends of the band remain in tight non-slipping engagement with the threaded support rod.

11 Claims, 4 Drawing Figures

U.S. Patent    Jun. 25, 1985    4,524,935
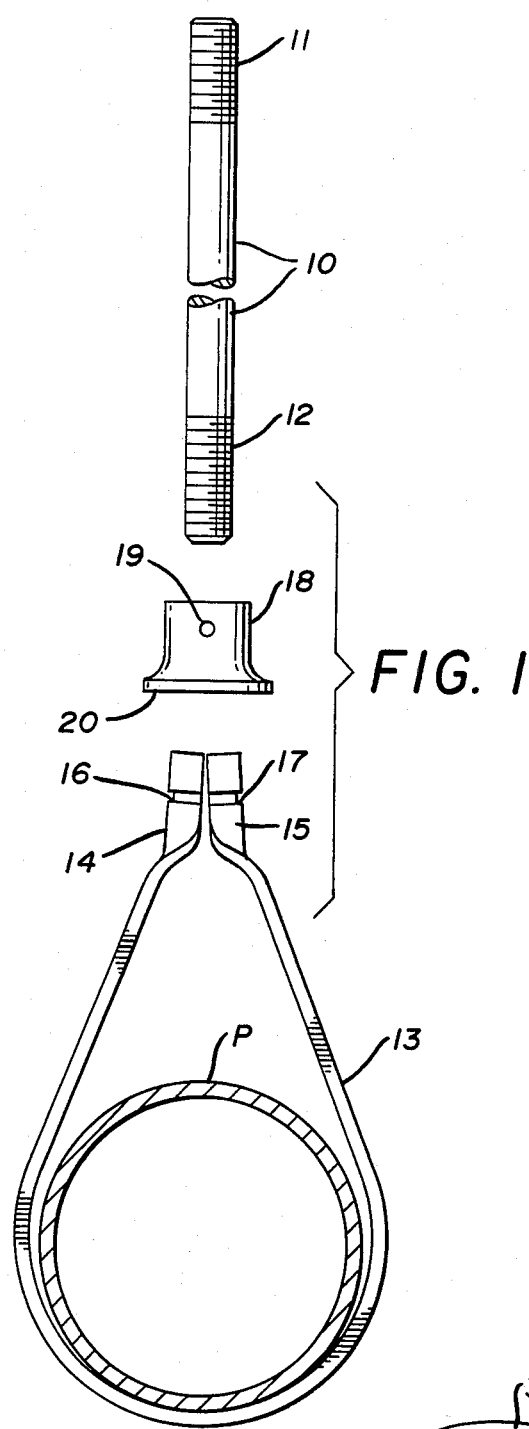
FIG. 1
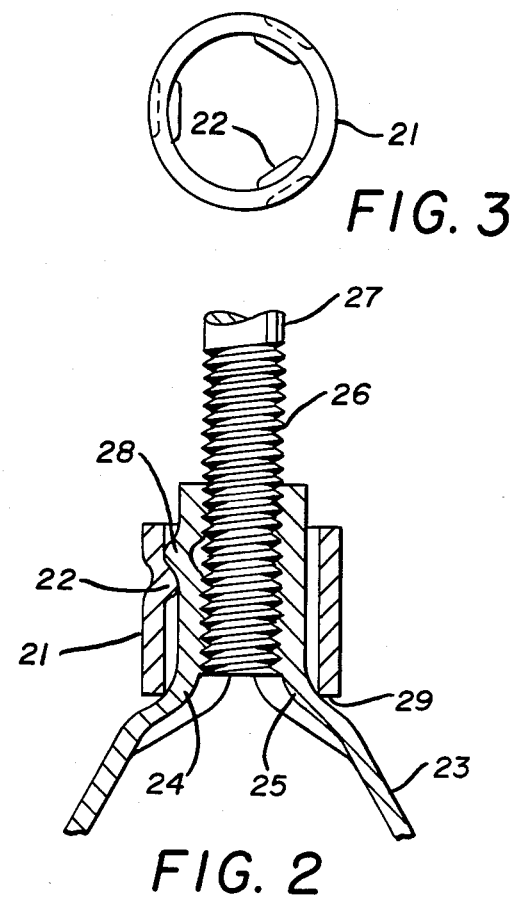
FIG. 3
FIG. 2
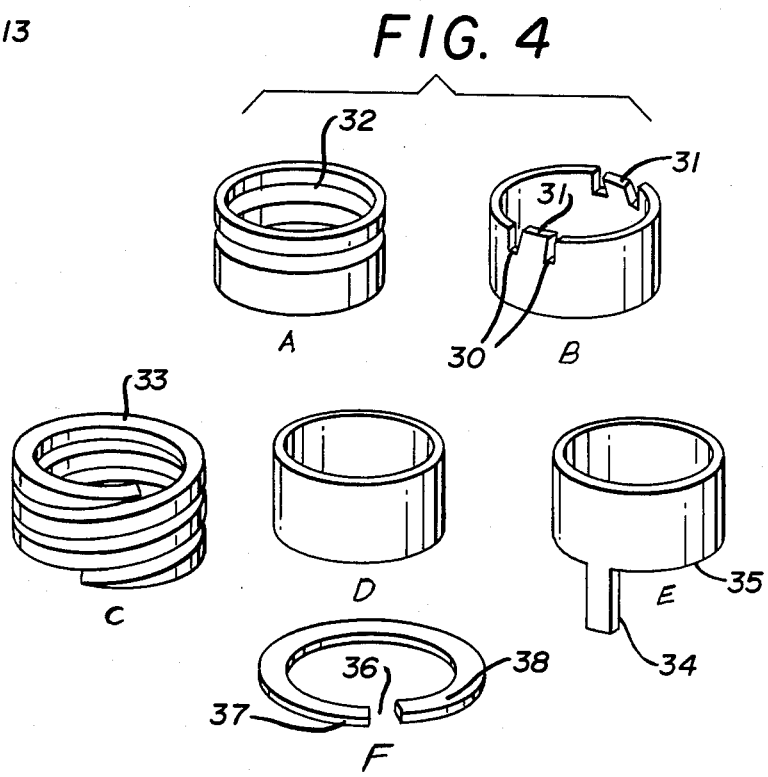
FIG. 4

PIPE HANGER

This is a continuation of my patent application Ser. No. 06/381,077, filed May 24, 1982, which was a continuation in part of my patent application Ser. No. 06/257,599, filed Apr. 27, 1981, abandoned.

BACKGROUND OF THE INVENTION

TECHNICAL FIELD

This invention relates to pipe hangers of the type normally employed to suspend pipes from overhead supports in spaced relation thereto.

DESCRIPTION OF THE PRIOR ART

Prior structures of this type have generally taken the form of a band arranged in a vertically disposed oval shape with its ends apertured and arranged in parallel horizontal superimposed position over a flanged cylindrical coupling which in turn is internally threaded for threaded engagement with a supporting rod and as illustrated in U.S. Pat. No. 2,996,274.

Proposals have been made to alter the usual pipe hanger constructions by clampingly engaging the pipe carrying portion on a supporting rod and such constructions may be seen in U.S. Pat. Nos. 476,227, 1,392,810, 1,870,651, 1,924,353, 3,493,206 and 4,306,696.

Swiss patent No. 592,837 discloses a strap which can be positioned around a pipe with its ends arranged in oppositely disposed relation on the sides of the threaded rod with a tubular member positioned thereover the held in desired position by a threaded nut engaging the threaded rod.

The present invention and its several modifications differ from the prior art in providing simple structures which are less expensive to manufacture and are easier to install than the prior art devices and particularly in the arrangement of the end configurations of the band in the areas where they engage the threaded rod and the novel configurations in the ferrulses which form locking devices which may be quickly and easily installed and/or removed.

SUMMARY OF THE INVENTION

An improved pipe hanger is disclosed which is formed of only two pieces which are engageable with a threaded support rod to form a complete pipe hanger. The pieces comprise an elongated band such as formed of sheet metal or metal strapping with end configurations defining arcuate shapes and internally threaded or knurled and arranged to be positioned against the outer opposite sides of a threaded support rod and wedged thereagainst by the application of a ferrule thereover, together with devices formed integrally with the ferrule which automatically engage the ends of the band and/or the support rod when the ferrule is moved downwardly over the ends of the band on the threaded rod to lock the assembly in desired pipe supporting position.

DESCRIPTION OF THE DRAWINGS

FIG. 1 is an exploded front elevational view with parts broken away illustrating a pipe hanger and a supporting rod;

FIG. 2 is an enlarged cross section of a portion of an assembly of a modified form of the pipe hanger seen in FIG. 1 with parts broken away;

FIG. 3 is a top plan view of the ferrule seen in FIG. 2; and

FIG. 4 is a multiple view of several alternately shaped ferrules A,B,C,D,E,F that may be used with the pipe hanger straps seen in FIGS. 1 and 2.

DESCRIPTION OF THE PREFERRED EMBODIMENT

By referring to FIG. 1 of the drawings, it will be seen that a support rod 10 having threaded end sections 11 and 12 respectively is illustrated and those skilled in the art will observe that such support rods are common in the pipe hanger art and are usually affixed at their upper ends to an overhead support such as a beam or the like usually by way of a clamp, not shown.

An elongated sheet metal strap 13 comprises the portion of the hanger which is positioned around a pipe P to be supported. The elongated strap 13 has end portions 14 and 15 respectively shaped in less than half circular arcuate configurations with representations of thread patterns or the like formed on their inner opposed surfaces and opposite portions 16 and 17 of an annular groove are formed in their outer surfaces. A resilient distortable ferrule 18 having at least one inwardly projecting dimple 19 and a slightly outturned annular lower edge 20 is arranged to be loosely positioned on the threaded rod 10 immediately prior to the positioning of the end portions 14 and 15 of the strap 13 against the threaded rod 10.

Still referring to FIG. 1, it will be seen that the ferrule 18 can then be moved downwardly over the arcuate end portions 14 and 15 of the strap 13 when distorted to a position where the inturned dimples 19 engage the grooves 16 and 17 in snap-in registry and the annular lower edge 20 engages the oppositely disposed outurned portions of the strap 13.

The thread patterns formed on the inner surfaces of the arcuate end portions 14 and 15 of the strap 13 may be alternately roughened areas or the like.

In FIG. 3 of the drawings, a top plan view of a modified ferrule 21 may be seen with several inwardly extending bosses 22 therein arranged in circumferentially spaced relation to one another so as to insure the registration of at least one of the bosses 22 in each of the grooves 16 and 17 as hereinbefore described.

It will be seen that the modified locking ferrule of FIG. 3 may be used in the pipe hanger assemblies illustrated in FIGS. 1 and 2 of the drawings.

By referring to FIG. 2 of the drawings, a modified strap 23 having ends 24 and 25 is illustrated positioned on a threaded section 26 of a support rod 27. An outturned boss 28 is formed on at least one of each of the ends 24 and 25 of the modified strap 23. The modified ferrule 21 of FIG. 3 is shown engaged on the ends 24 and 25 of the modified strap 23 where it has been rotated to position at least one of the bosses 22 thereon in under at least one of the outurned bosses 28 on the strap ends 24 and 25. Such engagement forcibly engages the lower edge 29 of the ferrule 21 against the strap 23 and ends 24 and 15 on the rod 27.

For removal of the ferrules from the assemblies which might at some time be necessary, the ferrule 18 as seen in FIG. 1 of the drawings and the ferrule 21 of FIG. 2 can be disengaged by applying upward and/or rotary motion to the ferrules so as to free the registering configurations from the arcuate grooves 16 and 17 in FIG. 1 or from beneath the bosses 28 in FIG. 2.

In FIG. 4 of the drawings, further modifications of ferrules usable with the pipe hangers of FIGS. 1 and 2 may be seen and by referring thereto it will be seen that a cylindrical ferrule B has a pair of spaced cutaway slots 30 on the opposite sides thereof extending approximately one-third of the overall height of the ferrule B. The areas between each of the pairs of slots 30 form distortable tabs 31 which are distorted as by peening the same inwardly toward one another. When the ferrule B is engaged over the end portions 14 and 15 of the strap 13 with the upper inturned edges of the tabs 31, which result from their distortion, engaging the arcuate grooves 16 and 17, the ferrule is locked in position.

In FIG. 4 of the drawings, a further modificatiion of a ferrule may be seen and wherein a cylindrical ferrule A has an annular inturned rib 32 positioned inwardly of its upper and lower ends so that the modified ferrule A can be used in the pipe hanger assemblies illustrated in FIGS. 1 and 2 of the drawings and hereinbefore described by simply forcibly positioning the ferrule A downwardly over the ends of the pipe hanger straps so as to result in the snap-in engagement of the annular inturned rib 32 in the grooves 16 and 17 in the ends of the strap 13 as seen in FIG. 1 of the drawings or in snap-in engagement beneath the outturned bosses 28 on the end of the pipe hanger strap 23 in FIG. 2 of the drawings. In either situation, some distortion of the modified ferrule A occurs and its inherent resiliency results in the snap-in like engagement which satisfactorily holds the straps of the pipe hanger assemblies firmly on the threaded portions of the support rods.

Still referring to FIG. 4, a modified ferrule C is shown as being formed of a tightly wound spiral of cross sectionally square steel rod 33. The modified ferrule can be pushed downwardly and rotated over the ends 14 and 15 of the strap 13 in the pipe hanger assembly of FIG. 1 or over the ends 24 and 25 of the strap 23 of the pipe hanger assembly shown in FIG. 2 of the drawings with the sharp edges of the cross sectionally square spiral rod engaging the configurations formed by the grooves 16 and 17 in the ends 14 and 15 of the strap 13 in the assembly of FIG. 1 or engaging the outturned bosses 28 on the ends 24 and 25 of the strap 23 of the pipe hanger assembly seen in FIG. 2.

A further modification of the ferrule may be seen in FIG. 4 wherein a cylindrical ferrule D has an internal diameter slightly less than the overall diameter of the ends 24 and 25 of the strap 23 as seen in FIG. 2 of the drawings, including the outturned bosses 28 so that distortion of the resilient ferrule D is necessary to place the same over the ends 24 and 25 and over the bosses 28 with the resulting inherent resiliency of the ferrule D maintaining the distorted shape and holding the ends of the strap 23 firmly on the support rod and its threaded area 26.

In FIG. 4 of the drawings, a further modified ferrule E is shown wherein the ferrule is a cylindrical member having a downwardly extending distortable tab 34 thereon. When the modified ferrule E is positioned over the ends of the straps 13 or 23 in the assemblies of FIGS. 1 and 2 of the drawings so that the lower annular edge 35 of the modified ferrule E is engaged against the outwardly curving portions of the respective straps 13 and 23, the tab 34 can then be bent inwardly in which position it will prevent the upward movement of the cylindrical ferrule E and at the same time by reason of its appropriate diameter hold the ends of the straps 13 or 23 firmly against the threaded support rod.

A split washer F having an inner diameter slightly smaller than the outer diameter of the ends 14 and 15 of the strap 13 as seen in FIG. 1 or slightly smaller than the ends 24 and 25 of the strap 23 as seen in FIG. 2 is pushed downwardly as a ferrule having a split 36 therein and the adjacent ends 37 and 38 of the split ferrule being out of registry vertically results in a satisfactory forceful positioning of the ends 14 and 15 of the strap 13 as in FIG. 1 and/or the forceful positioning of the ends 24 and 25 of the strap 23 of FIG. 2 against the respective support rods due to the resiliency of the split washer type ferrule, the end portions of the straps are firmly held against the threaded rods.

Still another version of a washer-type ferrule is possible by forming the same as a completely circular washer having a cross sectional area defined by its inner diameter for snug positioning over the ends 14 and 15 of the strap 13 of the pipe hanger in FIG. 1 of the drawings or over the ends of 24 and 25 of the strap 23 of the pipe hanger in FIG. 2 of the drawings.

Each of the modified ferrules A,B,C,D and E, as seen in FIG. 4 of the drawings and hereinbefore described, are preferably of a sufficient length or height so that the lower annular edges of each engages the oppositely disposed outturned portions of the pipe hanger strap when it is positioned over the respective ends thereof which causes a secondary locking or clamping action due to the distortion of the ferrule that occurs when it is so positioned.

It will thus be seen that an improved pipe hanger and several modifications thereof have been disclosed which are very inexpensive to manufacture and which are very easy to assemble about a pipe to be supported by a threaded support rod or the like. Each of the pipe hanger assemblies hereinbefore described comprise only two easy to form, inexpensive pieces of metal which can be produced on automatic machines rapidly and very inexpensively and which in operation in pipe hanger assemblies on suitable support rods are considerably easier and faster to install than the conventional pipe hangers heretofore known in the art.

Although several embodiments of the present invention have been illustrated and described, it will be apparent to those skilled in the art that other changes and modifications may be made therein without departing from the spirit of the invention and having thus described my invention,

What I claim is:

1. An improvement in a pipe hanger, which pipe hanger includes a strap to be positioned about a pipe to be suspended, the ends of said strap arranged to be moved to positions adjacent one another and secured to a threaded support rod, the improvement comprising means for securing said ends of said strp to said threaded support rod, said means consisting of cross sectionally arcuate end portions on said strap engaging the opposite sides of said threaded support rod, and a ferrule movably coaxially of said support rod over said end portions of said strap so as to move said end portions against said threaded support rod in non-slipping engagement therewith, and means for locking said ferrule in said position against said end portions, said locking means consisting of inter-engaging snap-in resilient configurations formed in said ferrule and in at least one of said end portions of said strap, said ferrule being resilient and distortable.

2. The improvement in a pipe hanger set forth in claim 1 and wherein said strap is a section of sheet metal and said snap-in resilient configurations formed in the ends thereof are cross sectionally arcuate outward projections and wherein inturned projections are formed in said ferrule, said outward projections being a size over which said ferrule may be moved when distorted to move said end portions of said strap into parallel relationship.

3. The improvement in a pipe hanger set forth in claim 1 and in which said configurations include grooves formed in the outer surfaces of said end portions of said strap and projections on the inner surface of said resilient and distortable ferrule registrable in said grooves.

4. The improvement in a pipe hanger set forth in claim 1 and wherein said configurations consist of at least one inward projection on said ferrule and at least one outstanding projection on at least one of said end portions of said strap, said inward projection arranged to be moved longitudinally of said end portions of said strap beside said outward projection to a position where partial rotation of said ferrule moves said projection into superimposed locking relation beneath said outstanding projection on said end portion of said strap.

5. The improvement in a pipe hanger set forth in claim 1 and wherein said configurations consist of oppositely disposed pairs of slots extending inwardly of one end of said ferrule a distance less than half the height of the ferrule with the portions of the ferrule between the oppositely disposed pairs of slots forming inturned resilient tabs and wherein transversely arranged grooves are formed in the outer surfaces of said end portions of said ferrule.

6. The improvement in a pipe hanger set forth in claim 1 and wherein said configurations for locking said ferrule on said end portions include forming said ferrule as a cylindrical shape formed of a spirally wound cross sectionally square spring metal rod, the edges of which are sharpened and arranged to be moved axially and rotatably over said end portions of said strap so as to resiliently and frictionally engage the same in self-retaining position thereon.

7. The improvement in a pipe hanger set forth in claim 1 and wherein said configurations include forming said ferrule as a cylindrical member, an annular inturned rib formed on the inner surface of said cylindrical member inwardly of the ends thereof and wherein transverse grooves are formed in the outer surfaces of said end portions of said strap, said ferrule arranged to be move axially over said end portions of said strap so as to resiliently and frictionally engage said annular rib in self-retaining position in said grooves.

8. The improvement in a pipe hanger set forth in claim 1 and wherein said configurations for locking said ferrule comprises forming said ferrule as a cylindrical shape having an internal diameter slightly less than the overall diameter of said ends of said strap whereby distortion of said cylindrical shape with the resulting inherent resiliency of the ferrule acts to maintain said ferrule on the ends of the strap and the ends of the strap firmly on said support rod.

9. The improvement in a pipe hanger set forth in claim 1 and wherein said configurations for locking said ferrule comprise forming said ferrule as a cylindrical shape, a downwardly extending distortable tab on one end of said ferrule, said tab being moved into position between said ends of said strap and beneath said support rod when said ferrule is positioned over the ends of said straps.

10. The improvement in a pipe hanger set forth in claim 1 and wherein said configurations for locking said ferrule comprise forming said ferrule as a split washer arranged in a flattened spiral shape, said split washer having a normal inner diameter slightly less than the overall diameter of the ends of said strap when positioned against said support rod whereby distortion of said spirally shaped split washer urges said ends of said strap toward said support rod.

11. The improvement in a pipe hanger set forth in claim 1 wherein a sleeve of adhesive material is positioned over the ends of said straps and said ferrule is positioned thereover and distorted to engage said sleeve of adhesive material on said ends of said straps and on the inner surface of said ferrule so as to hold said ferrule in position thereon.

* * * * *